US005508510A

United States Patent [19]
Laverty, Jr. et al.

[11] Patent Number: 5,508,510
[45] Date of Patent: Apr. 16, 1996

[54] PULSED INFRARED SENSOR TO DETECT THE PRESENCE OF A PERSON OR OBJECT WHEREUPON A SOLENOID IS ACTIVATED TO REGULATE FLUID FLOW

[75] Inventors: Martin J. Laverty, Jr., Charlottesville; Robert N. Capper, Jr., Roanoke; Steve Davis, Roanoke; Gary Hamrick, Roanoke; Timothy Eichblatt, Roanoke; Chuck Tavares, Roanoke; Ryp R. Walters, Christiansburg, all of Va.

[73] Assignee: Coyne & Delany Co., Charlottesville, Va.

[21] Appl. No.: 156,370

[22] Filed: Nov. 23, 1993

[51] Int. Cl.[6] .................................................. H01J 40/14
[52] U.S. Cl. ............................ 250/221; 250/222.1; 4/304
[58] Field of Search ................................ 250/221, 222.1,
250/561, 559.4; 356/4.01; 251/30.01, 30.03,
129.04, 129.09; 4/304

[56] References Cited

U.S. PATENT DOCUMENTS

| | | | |
|---|---|---|---|
| 3,670,167 | 6/1972 | Forbes | 250/221 |
| 4,767,922 | 8/1988 | Stauffer | 250/221 |
| 4,793,588 | 12/1988 | Laverty, Jr. | 251/30.03 |
| 4,915,347 | 4/1990 | Iqbal et al. | 251/30.03 |
| 4,938,384 | 7/1990 | Pilolla et al. | 250/221 |
| 4,972,070 | 11/1990 | Laverty, Jr. | 250/221 |
| 5,025,516 | 6/1991 | Wilson | 250/221 |
| 5,225,689 | 7/1993 | Buckle et al. | 250/561 |

*Primary Examiner*—Edward P. Westin
*Assistant Examiner*—Steven L. Nichols
*Attorney, Agent, or Firm*—McAulay Fisher Nissen Goldberg & Kiel

[57] ABSTRACT

Pulsed infrared sensor including a solenoid to detect the presence of a person or object whereupon the solenoid is activated to regulate fluid flow, including a microprocessor for receiving inputs from a plurality of sources and to provide outputs to a plurality of receivers for the control of the fluid flow, and a collection of inputs receivable by the microprocessor from sources activated in response to infrared rays received after transmission from an infrared transmitter including a remote transmitter associated with the microprocessor to activate a fluid supply control to control the supply of fluid to the fixture.

23 Claims, 15 Drawing Sheets

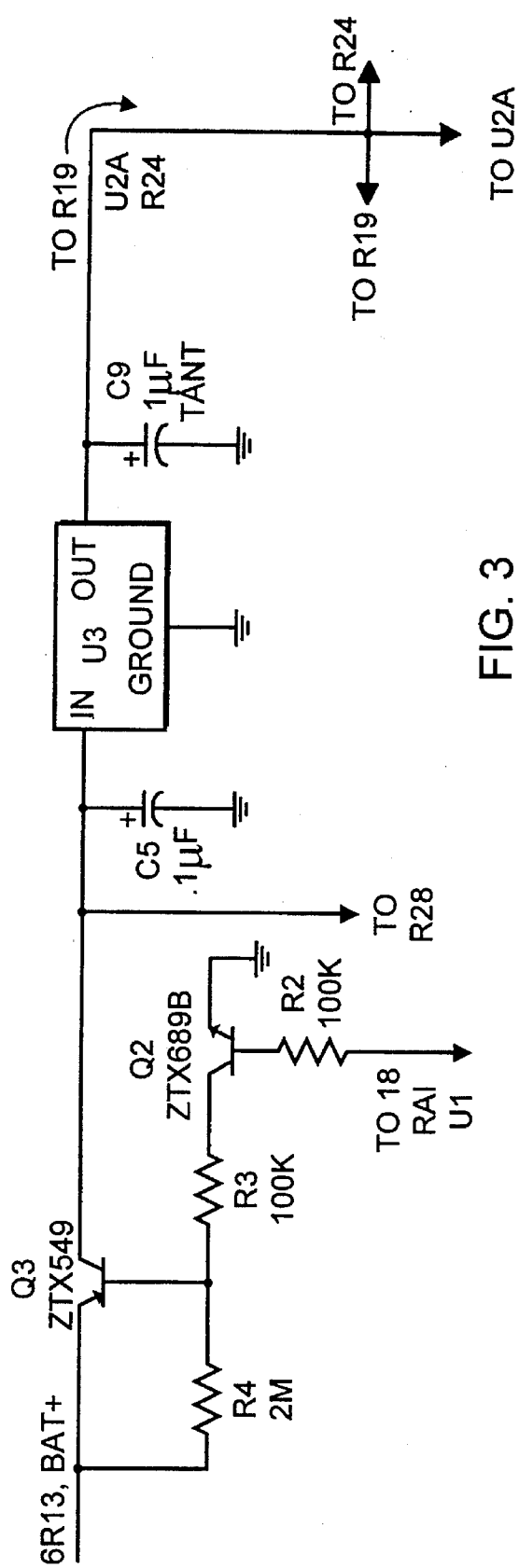
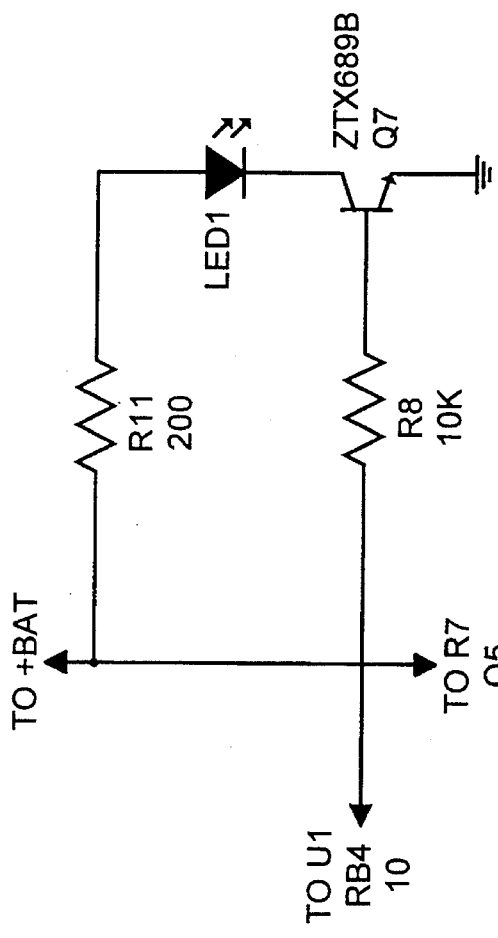
FIG. 3
FIG. 4

PULSED INFRARED SENSOR TO DETECT THE PRESENCE OF A PERSON OR OBJECT WHEREUPON A SOLENOID IS ACTIVATED TO REGULATE FLUID FLOW

BACKGROUND OF THE INVENTION

1. Field of the Invention

This invention is concerned with a liquid supply unit which is a low power means such as a low power battery and includes a low battery indicator rendered operative in response to activation by an infrared controlled electronic sensor.

More particularly, the invention is concerned with an electronic sensor and solenoid valve contained in a single unit for operating one form of a liquid supply unit, in particular, a flush valve and which is operable with a low battery and includes a low battery indicator.

This invention is also applicable to liquid supply units such as water supply units and, in particular, to the supply of water to plumbing fixtures.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

This invention is an improvement over U.S. Pat. No. 4,793,588 assigned to Messrs. Coyne & Delany Company, the assignee of this application, and the inventor of which is Martin J. Laverty, Jr.

The aforesaid U.S. Pat. No. 4,793,588 is incorporated herein by reference so that if any portion of the disclosure is necessary to complete this disclosure, it can be used even though it now forms part of the prior art and background of the invention.

The flush valve of the prior art, when used with the present invention, is also operable without an external handle.

This invention as well as the earlier invention and U.S. Pat. No. 4,793,588 referred to hereinbefore is also concerned with the replacement of an operating mechanism for a standard manufacturer's flush valve and the replacement of the conventional cover with a novel replacement cover and control module containing the solenoid valve and a sensor module employing the novel circuitry and microprocessor according to the present invention.

The prior art controls of the U.S. Pat. No. 4,793,588 are generally operable so that the control module is operable with 24 volts AC which is in turn connected with 24 volts DC.

SUMMARY OF THE INVENTION

One of the features of this invention is the provision of a solenoid valve in a solenoid valve body or other liquid or water supply unit for an infrared sensor operated flush valve employing novel circuitry and a microprocessor which can be controlled externally by means of a remote unit to avoid having to access the internal parts of the water supply unit.

A feature of the present invention is the use of a power supply, such as a six volt lithium battery, which in turn further reduces the problem of shock so that, should a fault occur in the circuitry, there is no possibility of an external shock to a user of the plumbing device. Moreover, the use of a six volt long-life lithium battery increases the time interval between which battery replacement is necessary.

The invention also provides for tunnel sections angled at 16° to the horizontal plane to narrow the beam to which a photodiode is responsive as part of a returning signal from a remote object.

A further feature of the invention is a deactivation circuit to reduce the drain power on the six volt battery when the system is in its non-operating mode.

Another feature of the invention is to provide at least one flush every 24 hours after the last flush for sanitary reasons.

It is clear that, with the present invention, no electrical connections are required and improved efficiency and hygiene is provided. Moreover, with the low voltage installation there is a greater opportunity to avoid any shock.

In addition to the normal test of the flush valve once every 24 hours and the low battery indicator, a visual range adjustment is also provided.

The invention in general employs a microprocessor or microcontroller based infrared electronic sensors used to detect and signal or act on the presence of objects within their field of view and in particular to a method by which new and unique user controllable features and functions useful in the sensor's intended application may be incorporated into such a sensor and done so with a minimum added cost.

While it may be technologically feasible to incorporate a microprocessor or microcontroller device into such infrared sensor circuitry, the present invention, in addition to providing novel circuitry, also adds new and unique software features that enhances the utility and maintainability of the product.

The difficulty and inconvenience of partially disassembling a product such as that disclosed in the prior art to access protected controls or connections are overcome with the use of a remote control to vary the parameters of the operating unit and the prohibitive costs in connection with the inclusion of most if not all features that were beyond adjusting the sensing range and flush time. With the present invention, it is not necessary to disassemble the product to make these adjustments which are time consuming, error prone and a troublesome task. Moreover, the type of environment encountered in some types of plumbing applications are such that it would not be desirable to provide controls or connections readily accessible without disassembly as they would be subject to damage from environmental conditions and vandalism.

By utilizing a two way infrared communication link between a portable controlling instrument and a self contained battery powered infrared sensor, or an infrared sensor with battery retained memory, and powered by other means, and employing it in conjunction with the retentive memory and appropriate controlling software, to provide for an automatic range adjustment function commanded by an infrared remote control.

The invention provides for an automatic range adjust function that may be added and the control of the features may be most economically and efficiently integrated into the micro-controller or microprocessor based infrared sensor's circuit design.

BRIEF DESCRIPTION OF THE DRAWING

Fig. 3 illustrates a power control switched regulator or voltage regulating circuitry for a photodiode and associated amplifier circuitry;

FIG. 4 illustrates a low battery indicator circuitry;

DESCRIPTION OF THE PREFERRED EMBODIMENTS

Figure 1A:
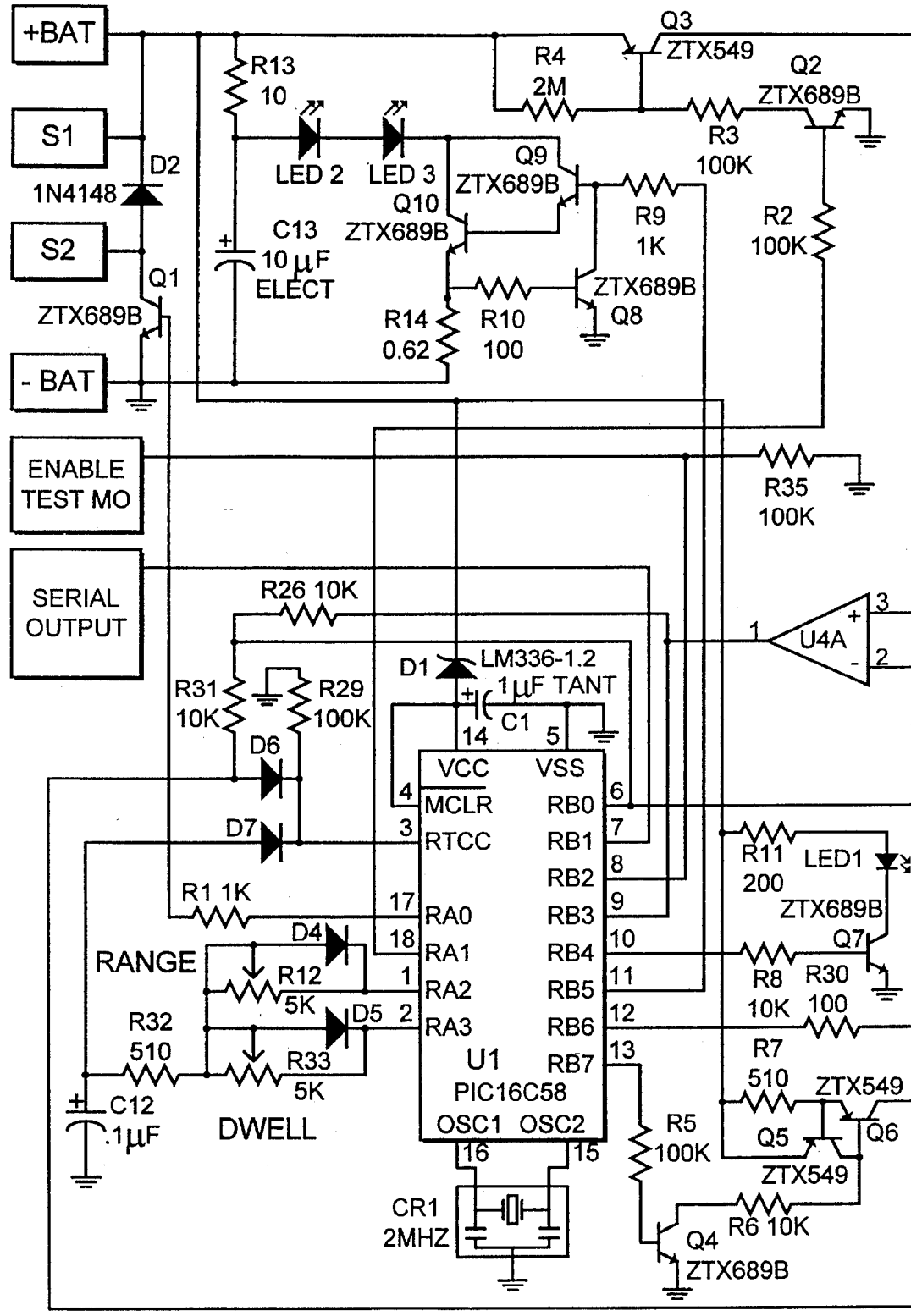
FIG. 1 which is composed of two sheets of drawings designated FIG. 1A
FIG. 1B is one embodiment of an electronic diffuse infrared sensor according to the invention and shows the entire circuitry.
Figure 1B:
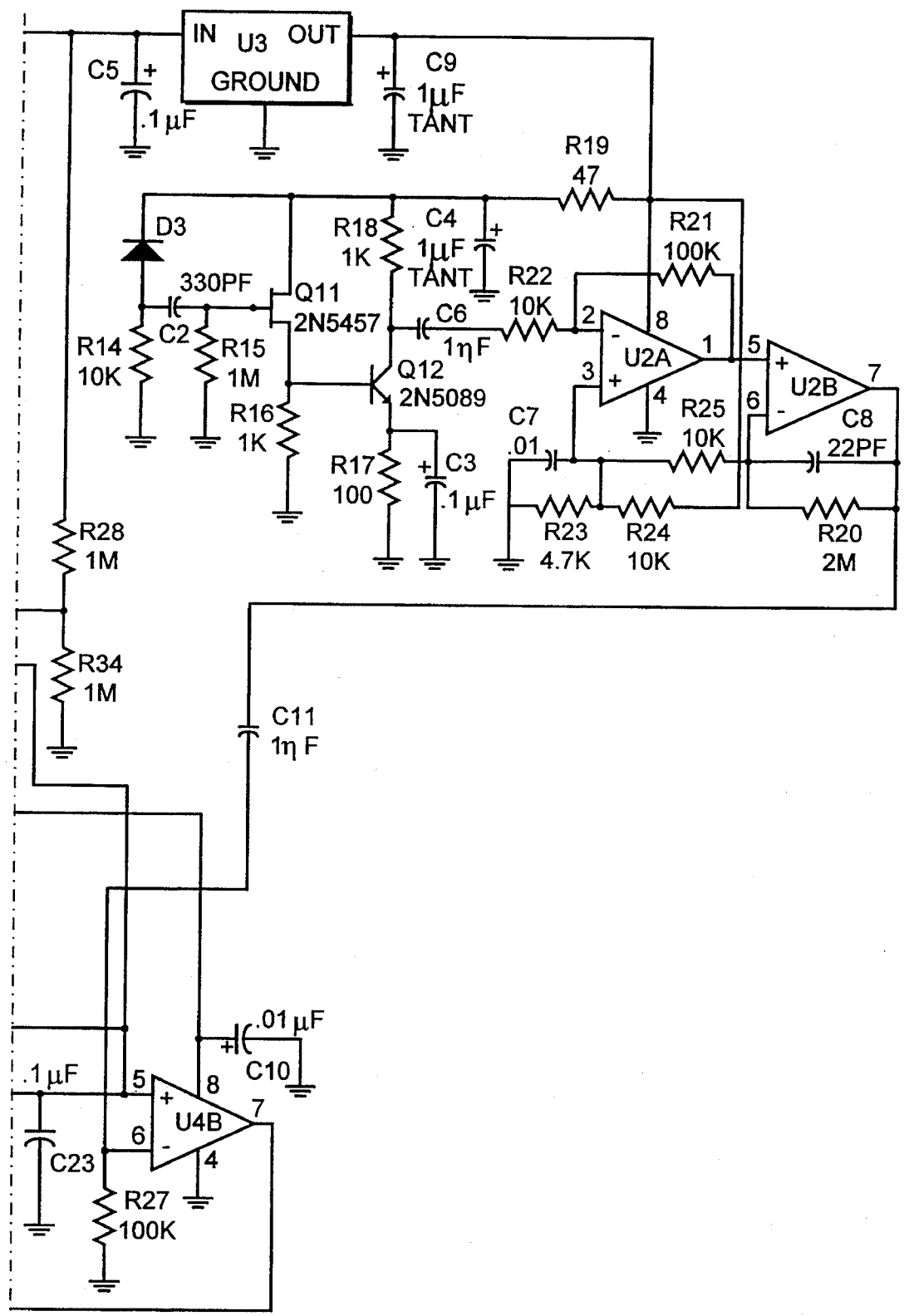
Figure 2:
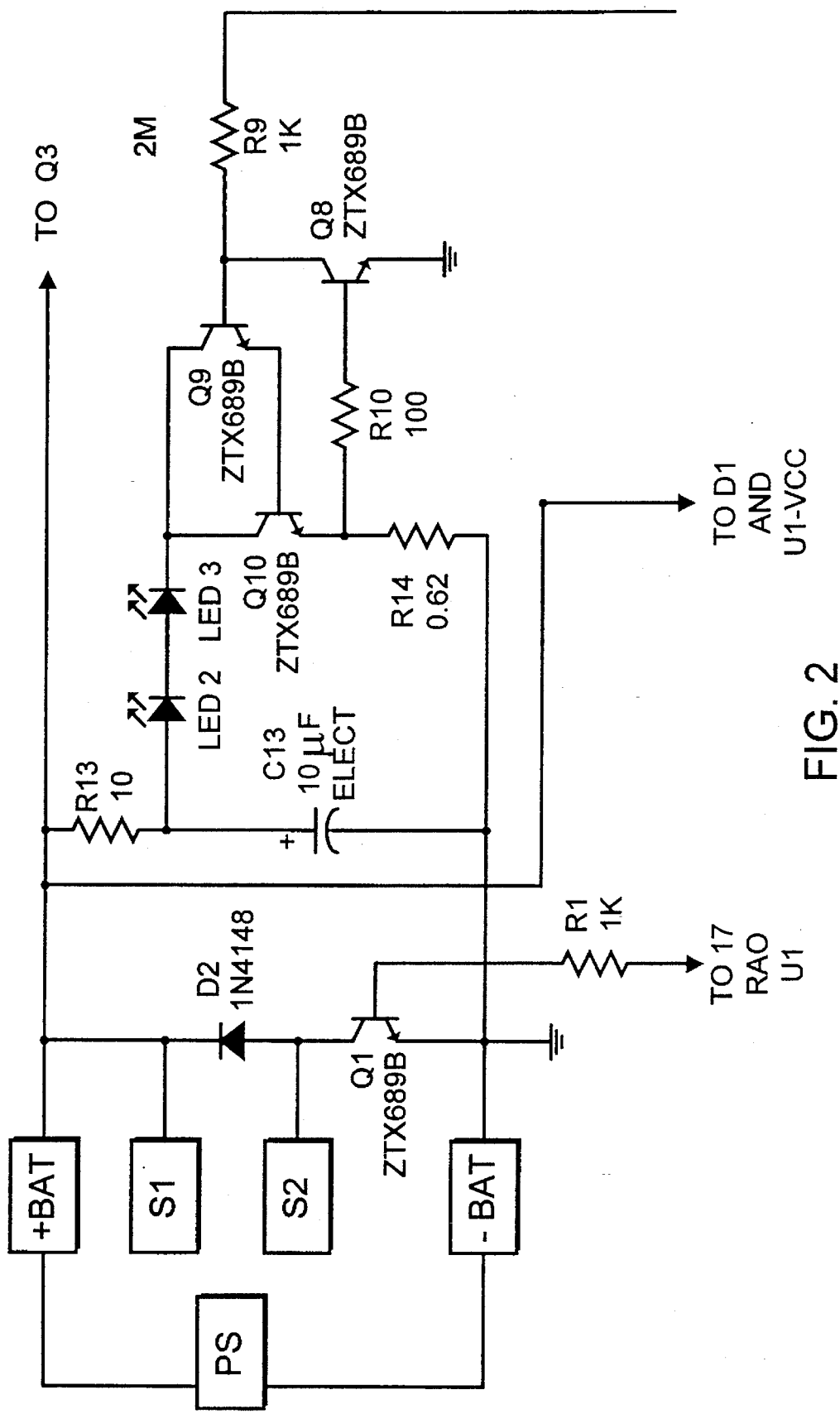
FIG. 2 is a portion of the circuitry of FIG. 1 and shows the solenoid driver circuit and an output device controlling means for controlling an external device.

Referring now more particular to FIG. 1 composed of FIGS. 1A and 1B and FIG. 2 which is a portion thereof and illustrates the solenoid driver D2, Q1 and R13, and output device controlling means forming part of the electronic diffuse infrared sensor shown in FIG. 1 for controlling an external or separate device, such as a solenoid (not shown), and comprises a power supply PS having a positive and a negative terminal connected across BAT+ and BAT–. The circuitry is electrically powered, preferably by a battery typically comprising two primary lithium cells of three volts having the battery's negative terminal connected to the point labelled –BAT and its positive terminal is connected to the point labelled +BAT. Power is at all times provided to point S1 to which a means of controlling an output device comprising valves controlling, such as for example, a flush valve or a water faucet, as an example, and the circuit includes one or more infrared L.E.D.(s) and their driving circuitry comprising R13, C13, LED2, LED3, Q10, Q9, Q8, R14, R10 and R9.

Referring now more particularly to Fig. 3 which illustrates a power control switched regulator circuitry comprising Q3, Q2, R4, R3, R2, C5, U3 and C9 for a photodiode and associated amplifier circuitry. Current is supplied by U1 through an output to the base of Q2 via R2. Q2 turns on causing current to flow in the base of Q3 via R3 enabling Q3 to turn on and source current to the voltage regulating circuitry comprising C5, U3 and C9.

Referring to FIG. 4 which illustrates the low battery indicator circuitry and comprises R11, R8, LED1 and Q7.

Figure 5:
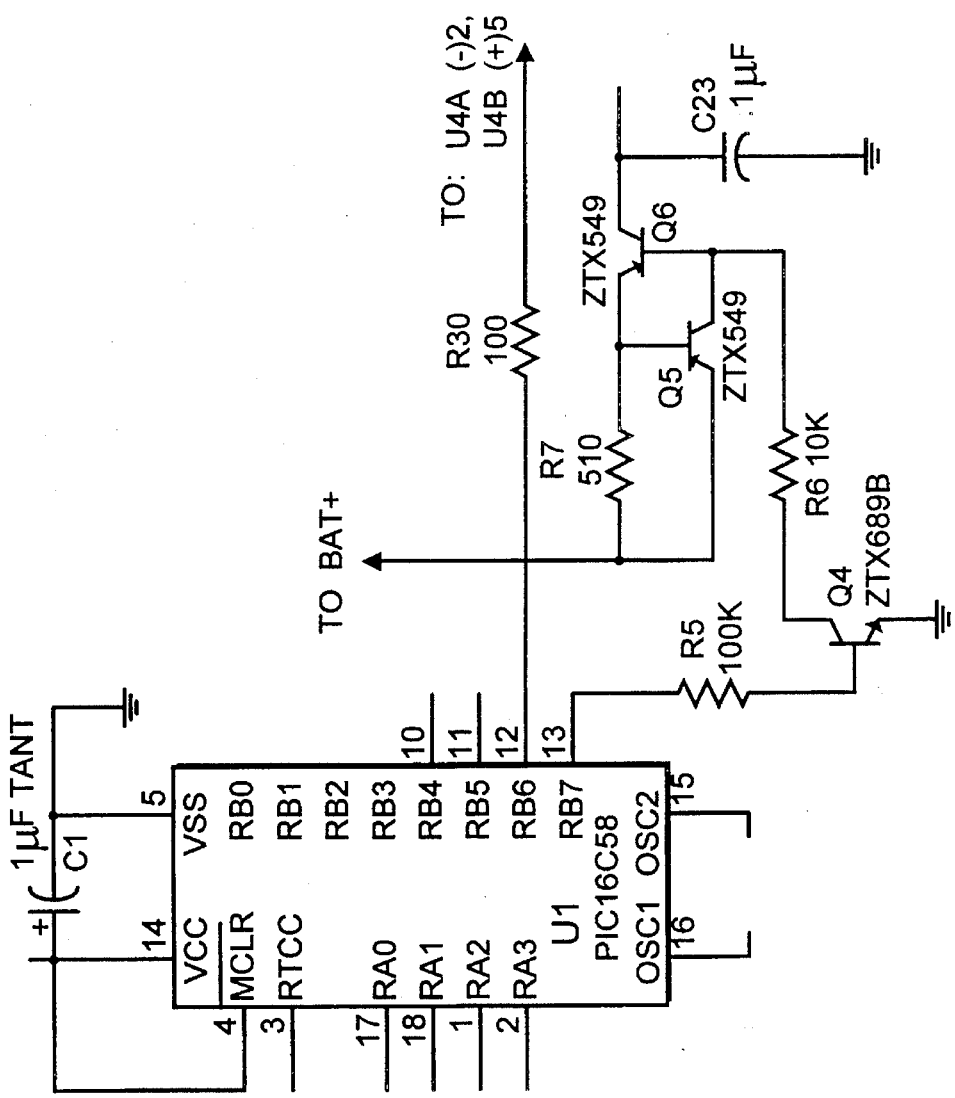
FIG. 5 illustrates the time to voltage converter circuitry.

FIG. 5 shows the time to voltage converter circuitry comprising R5, R6, R7, Q4, Q5, Q6, R30 and C23.

Figure 6:
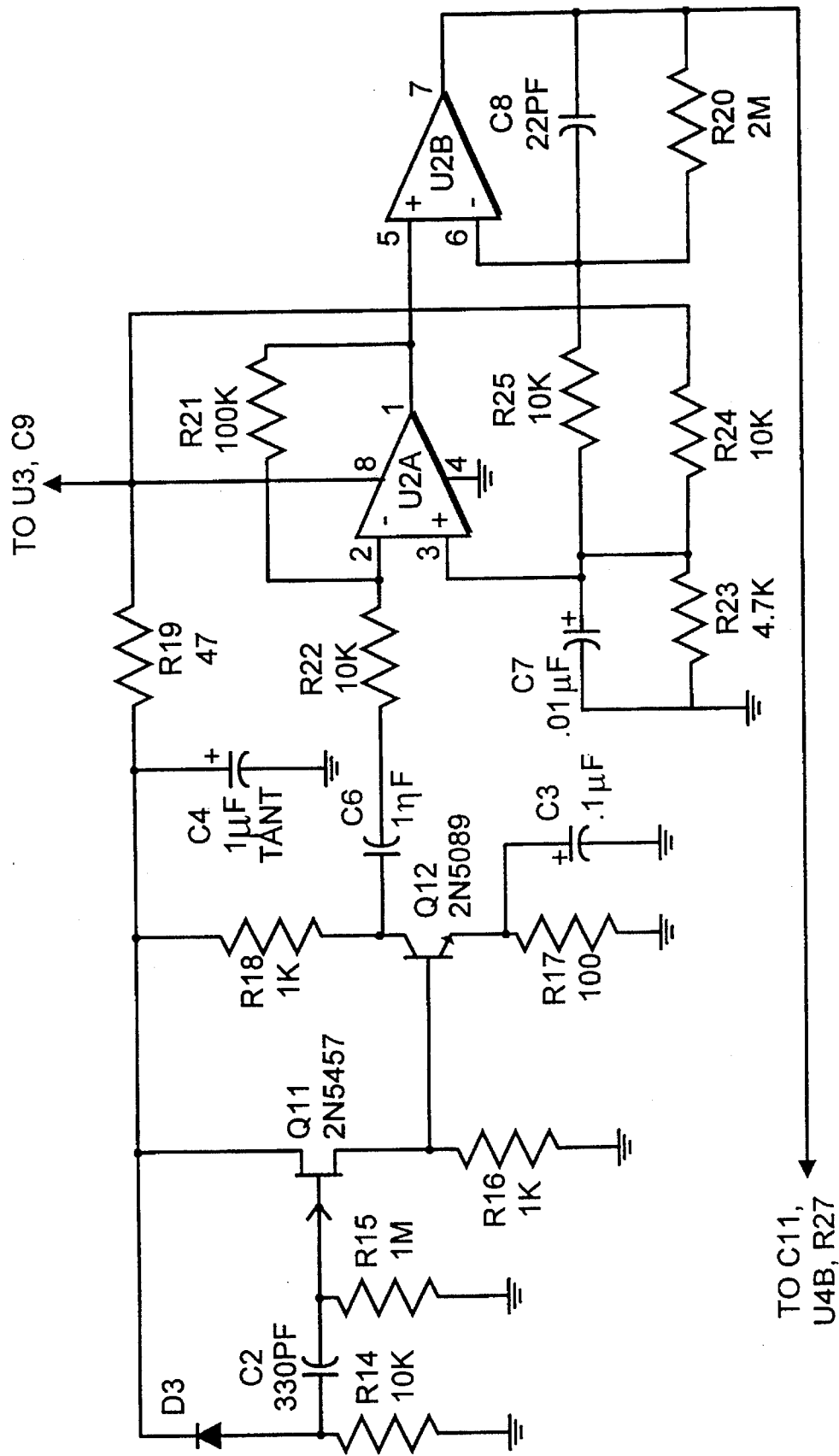
FIG. 6 illustrates circuitry portion for detection and amplification of the signal transmitted by the LED's and reflected.

FIG. 6 shows the circuitry for the detection and amplification of the signal transmitted by the LED's, i.e., LED2 and LED3 shown in FIG. 1A and reflected by an object in the field of view of the sensor or transmitted infrared signal from a portable controlling instrument via circuitry comprising D3, R14, C2, R15, Q11, R16, Q12, R18, R17, C3, C6, R22, U2A, R21, C7, R23, R24, R25, U2B, R20, C8, C11, R27, R19 and C4. It should be noted that the preferred LED's are infrared LED'S.

Figure 7:
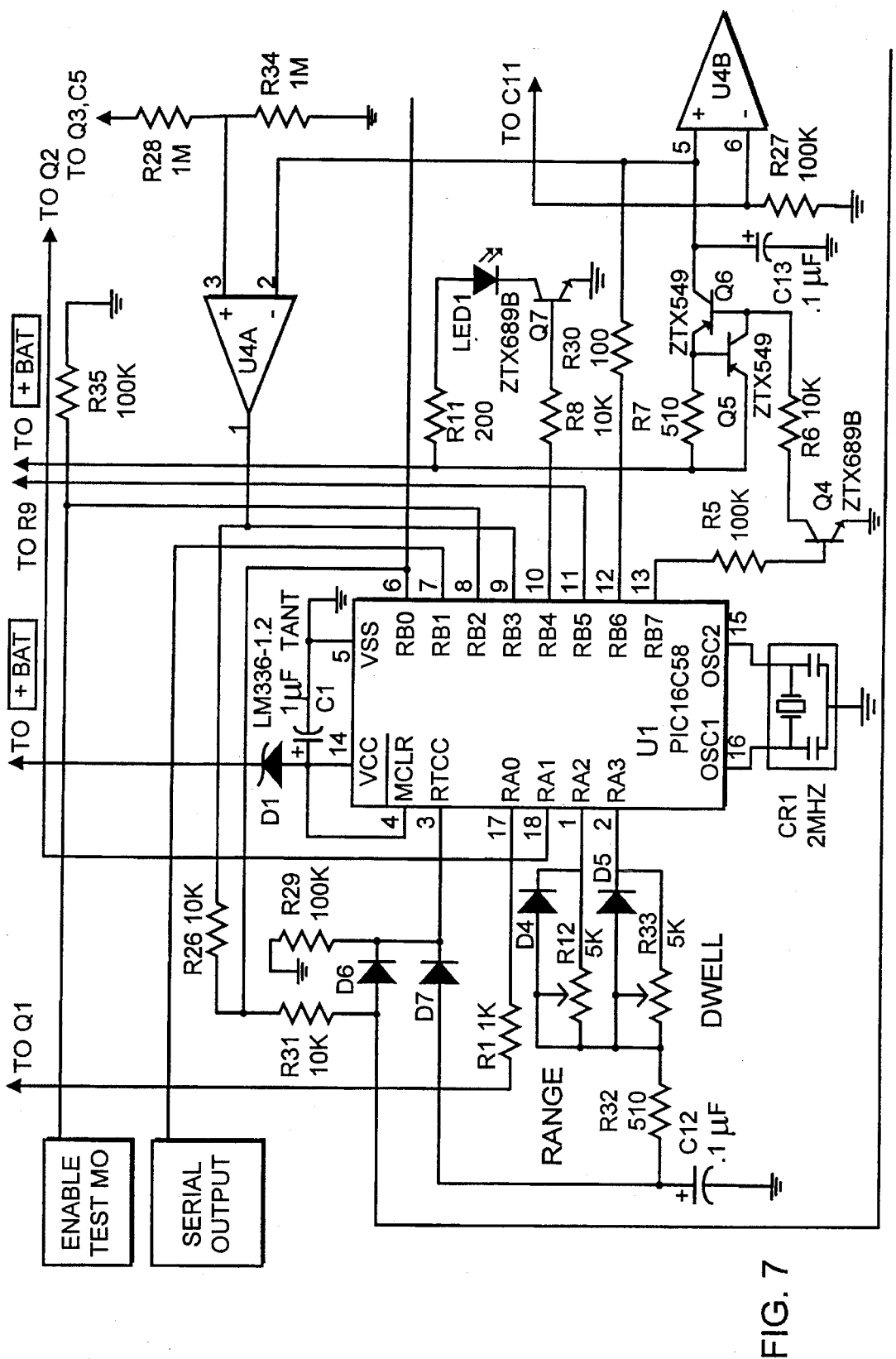
Fig. 7 illustrates a diagnostic serial output feature of the circuit.

Fig. 7 sets forth the diagnostic serial output feature and includes the enable test mode signal and serial output signal, and includes R35, contact 8-RB2 of U1 and contact 7-RB1 of U1.

Figure 8:
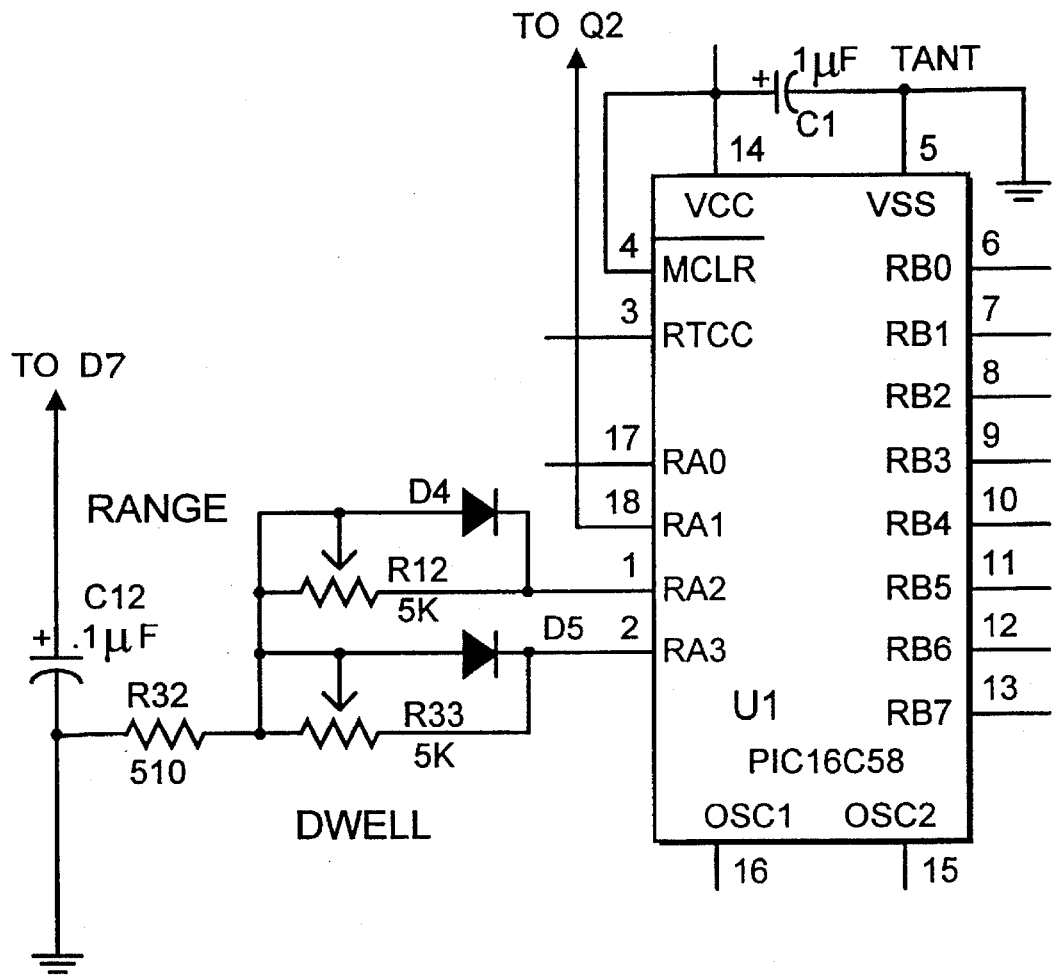
FIG. 8 illustrates the manual range and dwell adjustment and setting.

Referring to FIG. 8 which shows the manual range and adjusting potentiometers. The adjusting potentiometers are R12 and R3, and FIG. 1G includes R12, R33, R32, C12, D4 and D5.

Figure 9:
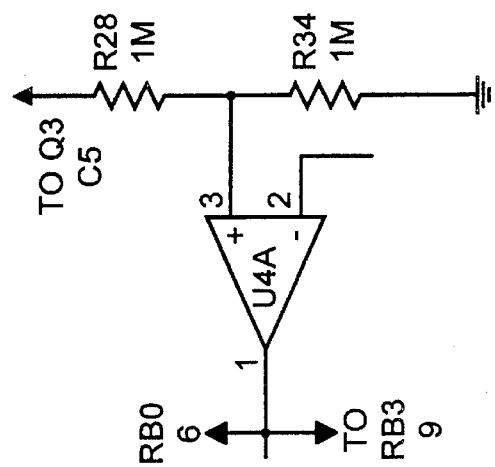
FIG. 9 illustrates battery voltage reading circuitry.

Referring to FIG. 9 which shows a battery voltage reading circuitry and this includes a voltage divider R28, R34 connected with U4A.

DESCRIPTION OF OPERATION OF FIG. 1 CIRCUITRY

The microcontroller integrated circuit supply current reducing element D1 is shown connected with BAT+ and microcontroller U1.y Provisions are made for switching means, see FIG. 2, for controlling an output device to thereby provide it with operating current via connecting point S2 and transistor switch Q1. D2 is provided to prevent circuitry damage from switching inductive output devices.

The purpose of the voltage regulating circuitry (C5, U3, C9) is to provide an operating voltage to the photodiode and associated amplifier circuitry that will not decrease as the battery voltage decays over time. The voltage regulator U3 will provide a stable 4.0 volts output down to a battery voltage of approximately 4.1 this being, one means, enabling circuit operation down to approximately 4.1 volts and thereby extending useful battery life. The purpose of R4 which connects the base and emitter of Q3 is to insure that Q3 turns fully off so that no current is drawn during non-sensing operation of the circuitry.

Referring to the manual RANGE and DWELL adjustment potentiometers labeled respectively R12 and R33, means are provided by circuitry comprising additionally R32, C12, D4, and D5 whereby the microcontroller is able to read the settings of the adjustments as a local manual means of user control of the circuit range and dwell parameters. By providing voltage on pin 1 of U1 and simultaneously switching pin 2 from a grounded to a high impedance condition. (Note, the control is via control of software resident inside the microcontroller which has control of the status of all pins labeled RA# and RB#. This also applies to any similar reference where U1 sets/switches . . . pin x . . . ). Current is sourced to C12 via R12 and R32 causing C12 to accumulate a charge at a rate determined by the setting of R12 and subsequently causing the voltage across C12 to rise. Once the voltage across C12 rises above the threshold voltage of D7 that voltage minus the threshold voltage of D7 is switch by D7 to appear across R29 and at pin 3 of U1. Time is counted until the voltage at pin 3 of U1 reaches a detection threshold of approximately ⅔ the voltage at pin 14 of U1. The voltage is supplied from Pin 1 of U1 via R12, R32, D7. Ultimately U1 gets power from its voltage supply pin 14 via D1 from the battery. The time that is counted is then stored and used to control the range of the sensor. The dwell setting is read in an identical manner, but the functions of pins 1 and 2 are reversed and current is caused to flow initially through R33 instead of R12. The purpose of diodes D4 and D5 is to provide a means of rapidly discharging variable capacitor C12 via resistor R32 in order that the range and then the dwell settings may be read one after the other without an undue delay as C12 discharges to a zero volts starting point.

This method provides an economical means of reading manual settings with a relatively high resolution of typically as high as from 1 part in 16 to 1 part in 128 as may be required to properly control aspects of circuit operation.

Means are provided for facilitating manufacturing testing via connection points labeled ENABLE TEST MODE and SERIAL OUTPUT. This feature provides for an economical way to test and debug sensors in production by providing a means of enabling a software routine within the sensor to communicate to a computer over a wired connection the contents of the microcontroller's internal memory registers as a means of discerning aspects of the circuit's operation that would be useful in quickly determining the nature of manufacturing defects that may be present as well as implementing automated manufacturing processes and methods.

Referring to the L.E.D. driver circuitry (see FIG. 2) means are provided to decouple high current pulses provided to LED2 and LED3 comprising R13 and C13. Means are also provided to regulate the current supplied to LED2 and LED3 in order that the range of circuit operation is not affected by decaying battery voltage over time. When a current is sourced by U1 to the base of Q9 via R9, Q9 turns on causing increasing current to be sourced to the base of Q10 thereby causing an increasing current to flow in the emitter of Q10 and R14 subsequently developing an increasing voltage across R14 which is fed back to the base of Q8 via R10 causing Q8 to turn on and limit the current flowing into Q9 thereby causing current flow in the circuit to stabilize approximately at the point at which the voltage across R14 is equal to the threshold voltage of the emitter base junction of Q8.

Referring to the photodiode and associated amplifier circuitry power control switched regulator circuitry, Fig. 2, means are provided to switch operating current on and off to the photodiode and associated amplifier circuitry in order to conserve power when the sensor is not actively determining presence or communication with a remote programming instrument comprising R2, R3, R4, Q2, Q3.

In the time voltage time converter circuitry, U1 simultaneously switches pin 12 from a grounded to a high impedance condition and outputs a current on pin 13 to the base of Q4 via R5, Q4 turns on causing an increasing current to be sourced via R6 to the base of Q6 thereby causing an increasing current to flow in the emitter of Q6, R7 and via the collector of Q6 to C23. Current flowing in R7 causes a voltage to develop across R7 and consequently the emitter base junction of Q5. When the voltage across R7 reaches the threshold voltage of the emitter base junction of Q5, Q5 turns on to inhibit further increase in current to be supplied to the base of Q6 causing a constant current to be supplied by the collector of Q6 to C23. The purpose of R30 is to insure that C23 starts a zero volts by discharging it to ground via R30 into pin 12 of U1. The effect of this circuitry is to provide battery voltage independence and to cause a linear voltage ramp to be developed across C23. It is this voltage that is controlled and supplied to said battery voltage reading circuitry and said photodiode and associated amplifier output level detecting circuitry. This implementation of these functions provides an efficient flexible means of accomplishing these required functions in a most precise manor with a minimal expense.

The battery voltage reading circuitry in FIG. 9, which includes a voltage divider comprising R28 and R34 is connected to the collector of Q3 the output of the photodiode and associated amplifier circuit power control switch in order that it will only draw power from the battery only during operation of the photodiode and associated amplifier circuit. Battery voltage is read by enabling power to the photodiode and associated amplifier circuit, turning on power to the voltage comparator integrated circuit U4A via pin 9 of U1, turning on the time to voltage converter circuitry and counting time at a rate such that when the voltage presented at U4A pin 2 by the output of the time to voltage converter circuitry crosses the voltage level presented to pin 3 of U4A by the voltage divider causing the output of U4A at pin 1 to transition from a high to a low level. At this point the time count is stored and may be interpreted directly as the voltage in tenth volt units. In this manner the battery voltage is precisely read with a resolution of one tenth of a volt.

Referring to the photodiode D3 and associated amplifier circuitry, the cathode of photodiode D3 is reverse biased by voltage provided by the photodiode and associated amplifier circuit power control switched regulator circuitry and further filtered by filter control R19 and C4 of the detection and amplifier circuit to remove undue electronic noise that may be present. The anode connects to circuit ground via R14 which acts as a current to voltage converter in order to convert the current mode signal generated in the photodiode as a function of incident infrared energy into a voltage. The value is selected to be relatively low to prevent saturation of the photodiode in strong light such as sunlight. Additionally the signal is passed immediately through a high pass filter comprising C2 and R15 in Fig. E in order to discriminate more effectively the very high frequency signal presented by the reflected or transmitted infrared from the low frequency noise presented by various types of fluorescent lighting fixtures. At this point the signal is presented to an impedance transforming circuit comprising field effect transistor Q11 and resistor R16 that act to convert the signal to a low impedance to be presented to the input of the low noise amplifier circuitry comprising Q12, R18, R17 and C3.

The signal, being amplified by the low noise amplifier circuitry, is next presented to additional general amplification provided by circuitry comprising U2A, U2B, C6, R22, R21, C7, R23, R24, R25, R20 and C8. The output signal is then further conditioned by C11 and R27 in order to convert the signal that is positive and negative going about an operating bias point presented to amplifiers U2A and U2B by the junction of R23 and R24 into a positive going ground referenced signal to be presented to the input of the output level detecting circuitry comprising U4B and said time to voltage converter circuitry. The purpose of this conversion is to make the signal more compatible with the output of the time to voltage conversion circuit (against which it will be compared) which is also a positive going ground referenced signal.

If the polarity of the signal is traced through the various stages of amplification it will be found that at this point, the positive going signal which may be observed in response to the infrared pulse output by LED2 and LED3 and reflected by an object within the sensors field of view or output by a remote instrument actually corresponds to the falling edge of that incident infrared pulse.

This method is employed so as to make best use of the limited dynamic range offered by the integrated circuit amplifiers U4A and U4B operating a low operating voltage of 4 volts and in doing so to thereby significantly extend the useful sensing range of the circuit.

Referring to said means of photodiode and associated amplifier output level detecting, the conditioned output of said photodiode and associated amplifier at the junction of C11 and R27 is presented to pin 6 of U4B. A reference threshold level that is provided by turning on the time to voltage converter circuit for a period of time inversely proportional to the range set point. When said conditioned output of said photodiode and associated amplifier exceeds said reference level, the output of voltage comparator integrated circuit U4B at pin 7 transitions from a high to a low level thereby switching off D6 and allowing the voltage at pin 3 of U1 to be clamped to ground by R29 thereby signaling the microcontroller that there is an object in the field of view of the sensor reflecting a sufficient amount of energy to cause the output of said photodiode and associated amplifier to reach the range set threshold. The presence of an object is thereby detected.

CR1 is a ceramic resonator similar to a crystal and provides a stable time base for many of the time critical operations performed by the microcontroller U1.

D1 is a low power voltage reference capable of operating to below 10 microamperes thereby causing the operating voltage supplied to pin 14 of U1 to be lowered by nearly twenty five percent. Since the current drawn from the battery by microcontroller U1 is among other things dependent upon the operating voltage at pin 14, the inclusion of this element conserves a significant amount of energy thereby extending useful battery life.

R35 is to insure that pin 8 of U1 remains at ground when the enable test mode is not externally selected.

Portions of the source code for the procedure which actually performs the functions of a sensor for the control of a liquid supply unit. Due to the formatting requirements of patent applications, some portions of this and other portions of source code provided herein contain or may contain statements which are wrapped across more than one line (and hence would need to be restored to single-line format, or appropriate leaders inserted before being loaded for execution); but those skilled in the art will readily recognize these instances, and can readily correct them to produce formally perfect code.

```
1:      ;
2:      ;
3:      ;                                   IMPULSE FLUSHER PROTOTYPE III
4:      ;
6:      ;
7:      ;
8:      ;
9:      ;                          TO RUN ON MICROCHIP PIC16054 MICROPROCESSOR

11:     ;
12:     ;
13:     ;                          IN THE FOLLOWING, VARIABLES ARE DEFINED
14:     ;
15:     ;                                   DUMP DESIGNATORS:
16:     ;
17:     ;       PORT A          ;a
18:     ;       PORT B          ;b
19:     ;       PORT C          ;c
20:     ;
21:008-         ORG     8       ;               REG ADDRESS
22:008- DWELL   DS      1       ;d      0
23:009- RANGE   DS      1       ;e      1
24:00A- IFLMSB  DS      1       ;f      2       ;INTERMEDIATE FLUSHE
25:00B- IFLLSB  DS      1       ;g      3
26:00C- AFLMSB  DS      1       ;h      4       ;ABS FLUSHES
27:00D- AFLCSB  DS      1       ;i      5
28:00E- AFLLSB  DS      1       ;j      6
29:00F- BVOLTS  DS      1       ;k      7
30:010- SPLCMD  DS      1       ;l      8
31:011- ARMCNT  DS      1       ;m      9
32:012- GENFLG1 DS      1       ;n      A
33:013- GENFLG2 DS      1       ;o      B
34:014- AUTFLMSB DS     1       ;p      C
35:015- AUTFLLSB DS     1       ;q      D
36:016- SECURITY DS     1       ;r      E
37:017- RESERVED DS     1       ;s      F
38:018- IRDATA  DS      1       ;t
39:019- IRCMD   DS      1       ;u
40:01A- TEMP0   DS      1
41:01B- TEMP1   DS      1
42:01C- TEMP2   DS      1
43:01D- TEMP3   DS      1
44:01E- TEMP4   DS      1                       ;23rd WORD
45:     ;
46:     ; THE FOLLOWING ASSIGNS LABELS TO PORT PIN FUNCTIONS
47:     ;       EQUATES
48:     ;
49:=000 RTCLSB  =       RTCC.0
50:     ;
```

```
51:=000      COMPWR     =     RB.0              ;>0
52:=002      SERIALO    =     RB.1              ;>0
53:=004      DIAGSEL    =     RB.2              ;>0
54:=006      LOWBAT     =     RB.3              ;<
55:=008      LBATLED    =     RB.4              ;>0
56:=00A      IRLED      =     RB.5              ;>0
57:=00C      SHRIRAMP   =     RB.6              ;>0
58:=00E      RNGRAMP    =     Rb.7              ;>0
59:          ;
60:=000      VALVE      =     RA.0              ;>0
61:=002      RCVRPWR    =     RA.1              ;>0
62:=004      RANGEPOT   =     RA.2              ;>0
63:=006      DWELLPOT   =     RA.3              ;>0
64:          ;
65:          ; THE FOLLOWING ASSIGNS LABELS TO TIMER BITS
66:=000      CNT2       =     RTCC.0            ;CNT=uS/TRANSITION
67:=002      CNT4       =     RTCC.1
68:=004      CNT8       =     RTCC.2
69:=006      CNT16      =     RTCC.3
70:=008      CNT32      =     RTCC.4
71:=00A      CNT64      =     RTCC.5
72:=00C      CNT128     =     RTCC.6
73:=00E      CNT256     =     RTCC.7
74:          ;
75:          ; THE FOLLOWING ASSIGNS LABELS TO MEMORY FLAGS
76:=001      LOCKED     =     GENFLG1.0
77:=003      LOWBFLG    =     GENFLG1.1
78:=005      DETECTED   =     GENFLG1.2
79:=007      ARMING     =     GENFLG1.3
80:=009      ARMED      =     GENFLG1.4
81:=00B      TEMPFLG    =     GENFLG1.5
82:=00F      DETFLASH   =     GENFLG1.7         ;ENABLES FLASH ON DET
83:          ;
84:=001      ENREMRNG   =     GENFLG2.0
85:=003      ENREMDWL   =     GENFLG2.1
86:=005      STARTERR   =     GENFLG2.2
87:=00/      FRAMERR    =     GENFLG2.3
88:=009      AFLFLG     =     GENFLG2.4
89:=00B      MISSONE    =     GENFLG2.5
90:=00D      AUTRANGE   =     GENFLG2.6
91:          ;
92:          ;
93:          ;
94:          ; PROGRAM NUMERIC CONSTANTS
95:          ;
96:=009      AFLTIME    EQU   144               ;144~=24HRS
97:=000      IDLTIME    EQU   1                 ;1~=10M
98:          ;
99:          ;
100:         ; ASSEMBLER DIRECTIVES
101:         ;
102:000-                ORG   0
103:000-                DEVICE  PIC16C56,XT_OSC,WDT_ON,PROTECT_ON
104:3FF-AA5             RESET START
105:         ;
106:         ;    SUBROUTINES ARE POSITIONED FIRST IN THE PROGRAM AND ARE FOLLOWING
107:         ;
108:         ;    THESE ARE JUMPS TO DIAGNOSTIC OUTPUT ROUTINES IN MEMORY PAGE 2
109:000-5A3  DUMPREGS   SETB  PA0               ;SET FOR P1 OPERATION
110:001-A32             JMP   JDUMPR            ;JMP TO ROUTINE ON P2
111:         ;
112:002-5A3  DOCRLF     SETB  PA0               ;SET FOR P1 OPERATION
113:003-A58             JMP   JDOCRLF
114:
115:         ;
116:         ;    HERE TO VECTOR TO ROUTINES THAT EXECUTE SPECIAL COMMANDS
117:004-C01  DOSPLCMD   MOV   W,#1
118:005-090             SUBWF SPLCMD,0          ;GET SPLCMD-1 IN W
119:006-1E2             JMP   PC+W              ;EXECUTE IT
120:007-A0D             JMP   DOAUTRNG          ;RES FUR AUTO RANGESET
121:008-A10             JMP   CLRIF             ;CLR INT FLUSH
122:009-BBF             JMP   FLUSHTIME
123:00A-A13             JMP   SETMANL
124:00B-A16             JMP   TGLFLASH
125:00C-A19             JMP   UNLOCK
126:         ;
```

| | | | | | |
|---|---|---|---|---|---|
| 127:00D-5D3 | DOAUTRNG | SETB | AUTRANGE | ;FLAG AUTORANGING IN PROGRES | |
| 128:00E-513 | | SETB | ENREMRNG | ;FLAG PRESET RANGE | |
| 129:00F-B24 | | JMP | INITARNG | ;START AUTORANGING ROUTINE | |
| 130: | ; | | | | |
| 131:010-06A NT | CLRIF | CLR | IFLMSB | ;CLEAR INTERMEDIATE FLUSH CO | |
| 132:011-06B | | CLR | IFLLSB | | |
| 133:012-B81 | | JMP | SHUTDOWN | | |
| 134: | ; | | | | |
| 135:013-413 GE | SETMANL | CLRB | ENREMRNG | ;DISABLE REMOTE DWELL AND RAN | |
| 136:014-433 UES D) | | CLRB | ENREMDWL | ;SETTINGS. (R12 & R33 WILL B | |
| 137:015-B81 | | JMP | SHUTDOWN | | |
| 138: | ; | | | | |
| 139:016-C80 1B2 ASH | TGLFLASH | XOR | GENFLG1, #80h | ;TOGGLE ENABLE FLAG FOR "FL | |
| 140:018-B81 TION | | JMP | SHUTDOWN | ;VISIBLE LED ON SENSE" FUNC | |
| 141: T | ; UNLOCK RESTRICTED SENSOR FUNCTIONS IF CODE SENT IS CORREC | | | | |
| 142:019-954 | UNLOCK | CALL | READWORD | ;GET INCOMMING SEC CODE | |
| 143:01A-653 B81 | | JB | STARTERR,SHUTDOWN | | |
| 144:01C-673 B81 | | JB | FRAMERR,SHUTDOWN | | |
| 145:01E-712 A29 C | | JNB | LOCKED,SETSEC | ;F UNLOCKED, SET/CHG S | |
| 146:020-216 098 | | CJNE | IRDATA,SECURITY, SHUTDOWN | | |
| 147:024-412 | | CLRB | LOCKED | | |
| 148:025-074 | | CLR | AUTFLMSB | | |
| 149:026-075 | | CLR | AUTFLLSB | | |
| 150:027-92D | ACKSEC | CALL | SENDACKN | | |
| 151:028-B81 | | JMP | SHUTDOWN | | |
| 152:029-218 036 | SETSEC | MOV | SECURITY,IRDATA | | |
| 153:02B-512 | | SETB | LOCKED | | |
| 154:02C-A27 | | JMP | ACKSEC | | |
| 155: | ; | | | | |
| 156: | ; | | | | |
| 157: | ; THE FOLLOWING ROUTINE SENDS SERIAL DATA BY PULSING THE | | | | |
| 158: | ; INFRARED LED(S). STANDARD UART FORMAT IS USED WITH A | | | | |
| 159: | ; PULSE OCCURING IN THE CENTER OF 1'S BIT TIMES IN THE | | | | |
| 160: | ; DATA STREAM. | | | | |
| 161: | ; | | | | |
| 162: | ; ONEPULSE | MOV | TEMP2,#1 | ;NOT CURRENTLY REQD | |
| 163: | ; | SETB | TEMPFLG | | |
| 164: | ; | JMP | SND1BIT | | |
| 165: | ; | | | | |
| 166:02D-210 03B | SENDACKN | MOV | TEMP1,SPLCMD | | |
| 167:02F-CF0 13B | | OR | TEMP1,#0F0H | | |
| 168:031-97A | DELAYSND | CALL | T600uS | | |
| 169:032-C00 026 | SENDWORD | MOV | RB,#0 | ;THESE 2 TO PREVENT | |

"IMPULSE" OPERATING INSTRUCTIONS

Flush Time

Select setting 0–7 on S1 located to the left of the sensors. The following is a table of time that current will be applied to the solenoid.

| Setting | Time (sec) |
|---|---|
| 0 | 0.8 |
| 1 | 1.3 |
| 2 | 1.8 |
| 3 | 2.3 |
| 4 | 2.8 |
| 5 | 3.3 |
| 6 | 3.8 |
| 7 | 4.3 |

THE TIME OF ACTUAL FLUSH WILL BE DIFFERENT.

Settings 8 and 9 should not be used but for informational purposes they should give: 8–0.8 sec, 9–1.3 sec.

Range

Use small screwdriver or similar tool to turn small dial to the right of the sensors. Turned full counter clockwise is the minimum setting which corresponds to approximately 6" and full clockwise is the maximum setting which corresponds to approximately 58". However, the range is highly dependent on the the color and type of material in front of the "Impulse" unit. ESPECIALLLY at longer range distances.

Battery Low Indications

If the battery is low, either "Weak" or "Bad" the red light on the "Impulse" unit will stay on during the entire solenoid current on period. Typically it just blinks briefly at the beginning of the flush cycle.

Set by "Impulse" or Remote?

The current setting of time or range is determined by how that setting was last changed. If last changed by the Remote, the setting came from the Remote If last changed by the "Impulse", the setting came from the "Impulse". For example, when the "Impulse" unit is first powered up with a new battery, if S1 is set at 3, then the solenoid current on time is set at 2.3 seconds. If S1 is then turned to 4, the solenoid current on time will be 2.8 seconds. If the Remote is then used to change the setting to 5, the solenoid current on time will be 3.3 seconds. If S1 is now set to 2, the solenoid current on time will change to 1.8 seconds.

"IMPULSE" REMOTE OPERATING INSTRUCTIONS

General Operation Procedure
1. Turn POWER switch on.
2. Enter Security Code. Digits will clear if correct.
3. Point Remote at "Impulse" unit. Best position is 2" to 5" below and 8" to 15" from "Impulse" unit.
4. Wait for READY light to come on. If it does not light in 5 seconds, move Remote around very slowly until READY light comes on.
5. Choose and press TIME or RANGE function. Current setting will be displayed.
6. Press UP or DOWN button to change setting.
7. Press TIME or RANGE again to complete function.
8. Change TIME or RANGE again by following steps 5–7.
9. Turn POWER off when finished.

Entering Security Code
1. Turn POWER switch on.
2. Enter four digits using the four buttons on the front panel.
3. If the last digit disappears, the code was entered correctly. If it does not disappear, enter the four digits again. If this does not work, turn the Remote unit off, then on and try again.

Checking "Impulse" Unit Battery
1. Turn POWER switch on.
2. Enter Security Code. Digits will clear if correct.
3. Point Remote at "Impulse" unit. Best position is 2" to 5" below and 8" to 15" from "Impulse" unit.
4. Wait for READY light to come on. If it does not light in 5 seconds, move Remote around very slowly until READY light comes on.
5. One of the battery status lights should be on.
   Green—Good
   Yellow—Weak
   Red—Bad The battery may last a long while after reaching the "Weak" state but it should be changed immediately if "Bad" indicated.

Changing Flush Time
1. Turn POWER switch on.
2. Enter Security Code. Digits will clear if correct.
3. Point Remote at "Impulse" unit. Best position is 2" to 5" below and 8" to 15" from "Impulse" unit.
4. Wait for READY light to come on. If it does not light in 5 seconds, move Remote around very slowly until READY light comes on.
5. Choose and press TIME function. Current setting will be displayed.
6. Press UP button to increase Flush Time or DOWN button to decrease Flush Time. The following is a table of time that current will be applied to the solenoid.

| Setting | Time (sec) |
|---------|------------|
| 0 | 0.8 |
| 1 | 1.3 |
| 2 | 1.8 |
| 3 | 2.3 |
| 4 | 2.8 |
| 5 | 3.3 |
| 6 | 3.8 |
| 7 | 4.3 |

THE TIME OF ACTUAL FLUSH WILL BE DIFFERENT.

7. Press TIME again or remove Remote from in front of "Impulse" unit to complete function.
9. Turn POWER off when finished.

Changing Range
1. Turn POWER switch on.
2. Enter a Security Code. Digits will clear if correct.
3. Point Remote at "Impulse" unit. Best position is 2" to 5" below and 8" to 15" from "Impulse" unit.
4. Wait for READY light to come on. If it does not light in 5 seconds, move Remote around very slowly until READY light comes on.
5. Choose and press RANGE function. Current setting will be displayed.
6. Press UP button to increase Range or DOWN button to decrease Range. The minimum range setting is 6" and the maximum range setting is 58". However, the range is highly dependent on the the color and type of material in front of the "Impulse" unit, ESPECIALLLY at longer range distances.
7. Press RANGE again or remove Remote from in front of "Impulse" unit to complete function.
9. Turn POWER off when finished.

Portions of the source code for performing the functions of a sensor for the control of a liquid supply unit according to the second embodiment follows.

Portions of the source code for the procedure which actually performs the functions of a sensor for the control of a liquid supply unit. Due to the formatting requirements of patent applications, some portions of this and other portions of source code provided herein contain or may contain statements which are wrapped across more than one line (and hence would need to be restored to single-line format, or appropriate leaders inserted before being loaded for execution); but those skilled in the art will readily recognize these instances, and can readily correct them to produce formally perfect code.

```
; Port A bit assigment equates
;   Port A is configured as both input and output as follows:
;       bit 0 - Test 1                                                          ( Output )
;       bit 1 - Test 2                                                          ( Output )
;       bit 2 - Receive bit                                                     ( Input )
;       bit 3 - Battery Low indicator LED                                       ( Output )
;----------------------------------------------------------------------
Encoder2    EQU     00h             ;Encoder Jumper 2                   (IN - active HI )
Test1       EQU     01h
Test2       EQU     01h             ;Test 2 Pin                         (OUT - active HI )
IRRec       EQU     02h             ; Received pulse                    (IN - active LOW)
IRRecBin    EQU     b'00000100'     ;Binary masking for Receivsd Byte
LED         EQU     03h             ;Battery Low LED                    (OUT - active LOW)
;----------------------------------------------------------------------
; Port B bit assigment equates
;   Port B configured as an output port as follows:
;       bit 0 - Flush valve solenoid
;       bit 1 - I/R transmit
            MOVLW   80h             ;Set Pot arbitrarily at half gain
            MOVWF   ManADValue
            MOVWF   RecPotValue
            BSF     PortB,RecEn     ;Turn ON tile receiver
            CALL    CCheckConfig    ;Check for any changes in the configurat
            CALL    CheckBat        ;get initial battery status
            BCF     PortB,RecEn     ;Turn OFF the receiver
;       bit 2 - receiver power on
;       bit 3 - battery low
;       bit 4 - one second timer
;       bit 5 - ** debug **
;       bit 6 - battery check
;       bit 7 - flush time encoder
;----------------------------------------------------------------------
;   Bit Definitions
;
Trans       EQU     00h             ;Transmit Pulse                     (OUT - active HI )
Encoder4    EQU     01h             ;Encoder Jumper 4                   (IN - active LOW)
POTvCLK     EQU     02h             ;Digital Pot Clock                  (OUT - active HI )
                                    ;Manual Pot Feedback                (IN - )
Encoder1    EQU     03h             ;Encoder Jumper 1                   (IN - active LOW)
DATvDQ      EQU     04h             ;Digital Pot Data Line              (OUT - active HI )
                                    ;Battery Level Feedback             (IN - )
PotEn       EQU     05h             ;Digital Pot Enable                 (OUT - active HI )
Flush       EQU     06h             ;Flusher                            (OUT - active HI )
RecEn       EQU     07h             ;Receiver Power Enable              (OUT - active HI )
;----------------------------------------------------------------------
;
;                          Initial System Setup Procedures
;
;----------------------------------------------------------------------
RESET
            MOVLW   ADWriteA        ;Set the Four A Ports
            TRIS    PortA
            MOVLW   ADReadB         ;Set the eight B Ports
            TRIS    PortB
            MOVLW   b'00000000'     ;Initialize the Output ports
            MOVWF   PortB           ; All off
            MOVLW   b'00001100'     ;Initialize the Output ports
            MOVWF   PartA           ; All off except Receiver
            MOVF    Holder3,W       ;Return stored value to RecPot
            MOVWF   RecPotValue
            MOVF    STATUS, W       ;Check if this is a reset or power-up
            ANDLW   10H
            SKPNZ
            GOTO    CHECKUP         ;Don't initialize if this in a reset
            CLRF    FlushCntLSB
            CLRF    FlushCntMSB     ;   Clear 2 bytes of total flush counter
            CLRF    FlagByte        ;   Clear Flag of Occupied et al
            CLRF    FlushTime       ;   Clear Flag of Flushing
            CLRF    Range
            CLRF    Counter2        ;   Clear Counter
            CLRF    Counter3        ;   Clear Counter
            CLRF    Counter4        ;   Clear Counter
            CLRF    ManFlushTime    ;   Clear Current Flush Time
            MOVLW   FourMin         ;   110*2.2sec = 4min timer
            MOVWF   LastFlush       ;   Clear Counter of last use
            MOVLW   OneDay          ;157*9.22min = about 24hrs.
            MOVWF   Counter2        ;save it
```

The Impulse sensor is a battery powered, micro controller based circuit that makes use of infrared light to detect the presence of an individual in front of a water closet or urinal. Once an individual using the facility has bean detected for a few seconds, the circuit will wait until the person leaves and then automatically operate an electric solenoid valve to flush the water closet or urinal.

Figure 10A:
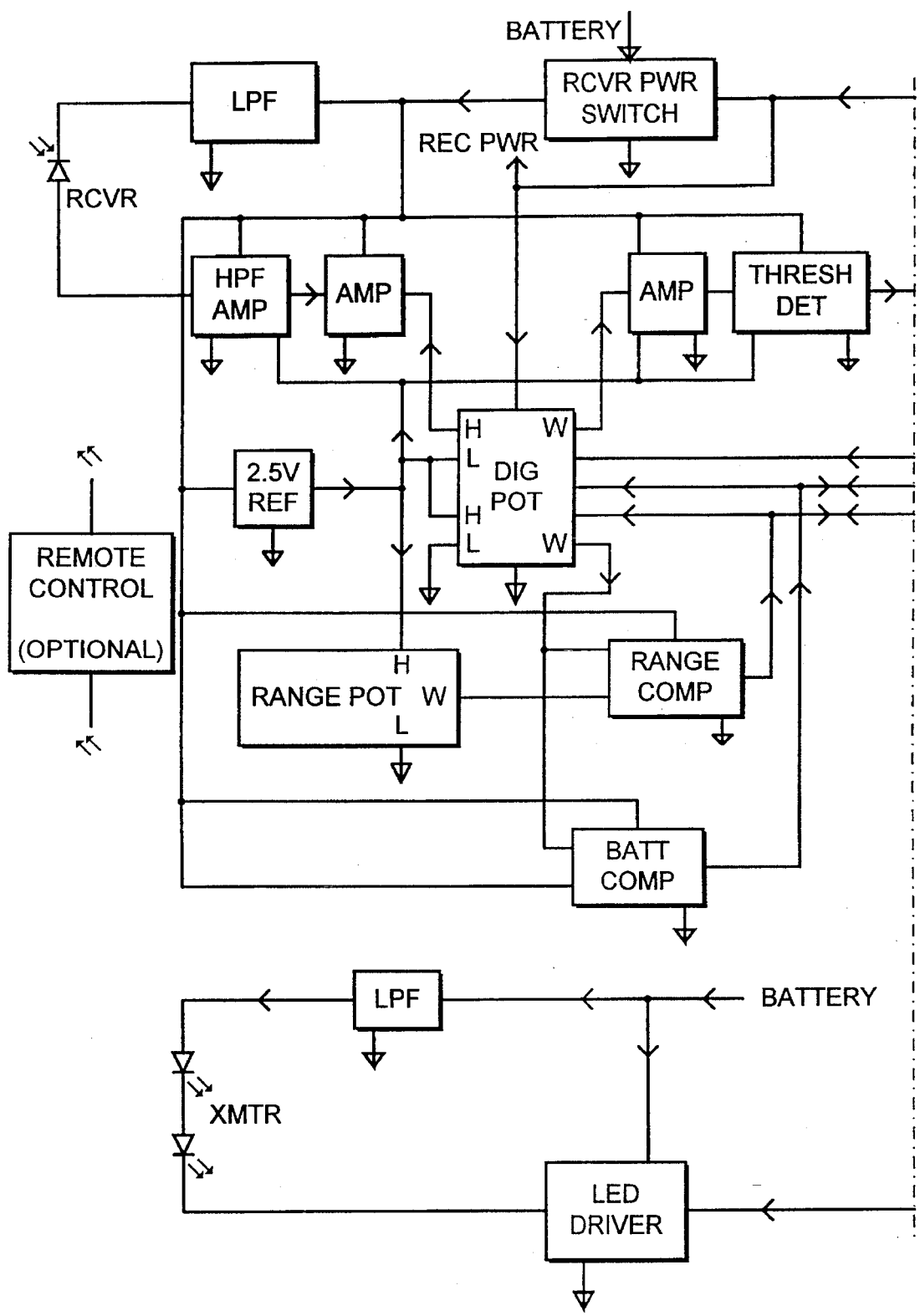
FIG. 10 which is composed of two sheets designated FIG. 10A
FIG. 10B is a functional block diagram of the impulse sensor according to another embodiment of the invention.
Figure 10B:
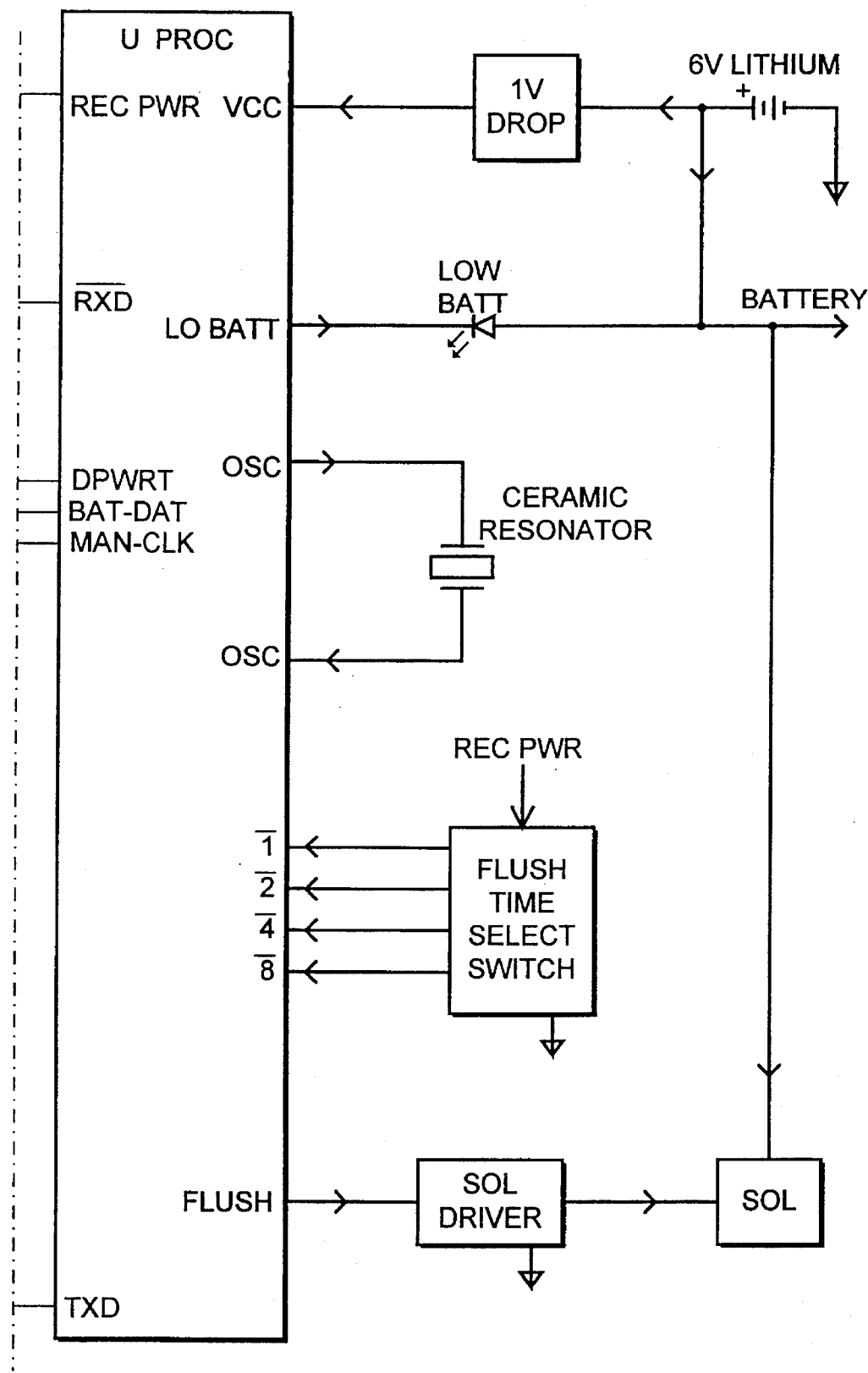
Figure 11A:
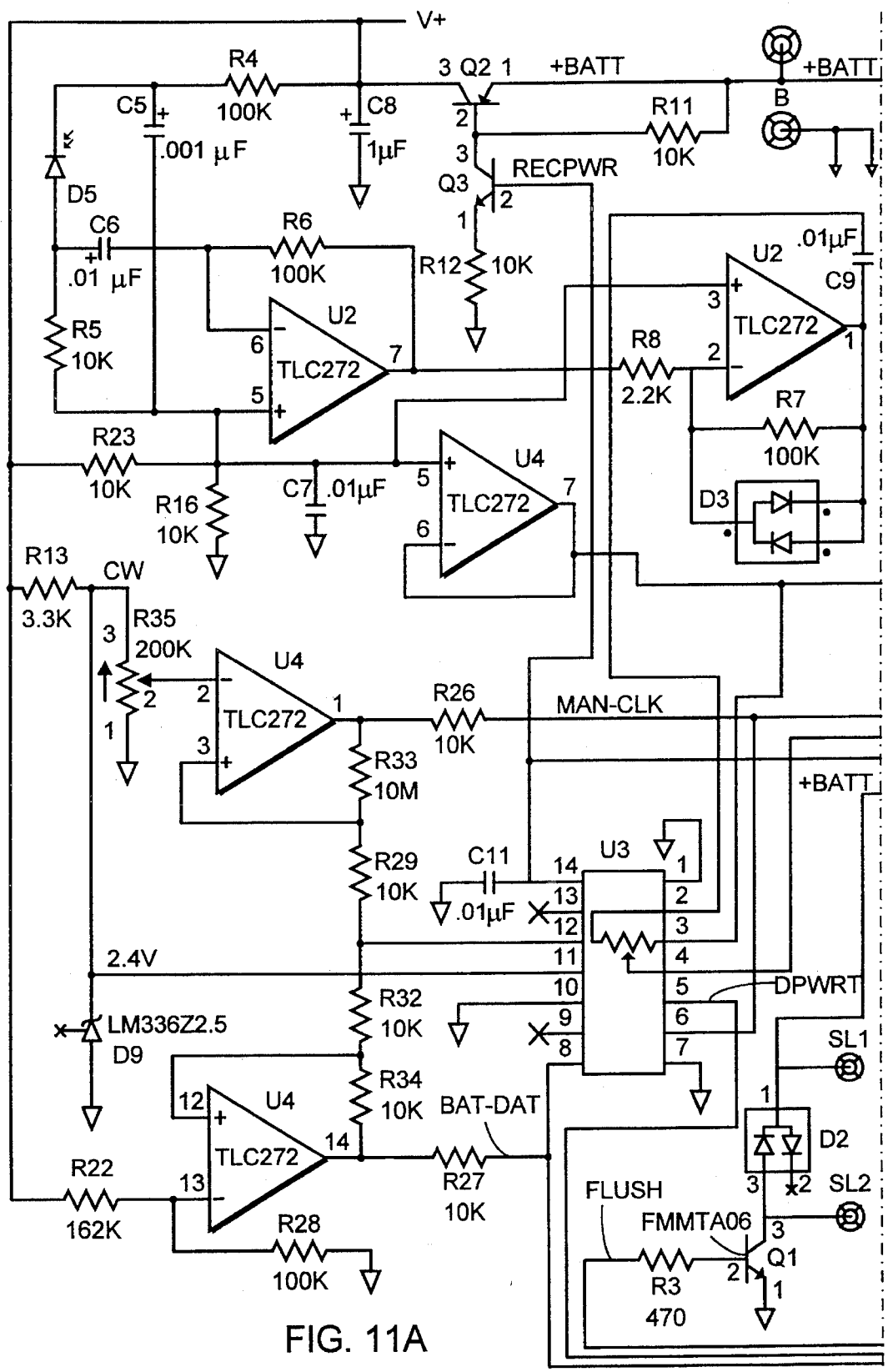
FIG. 11 which is composed of two sheets designated FIG. 11A
FIG. 11B is a schematic circuit diagram of the details of every component in the FIG. 10 embodiment.
Figure 11B:
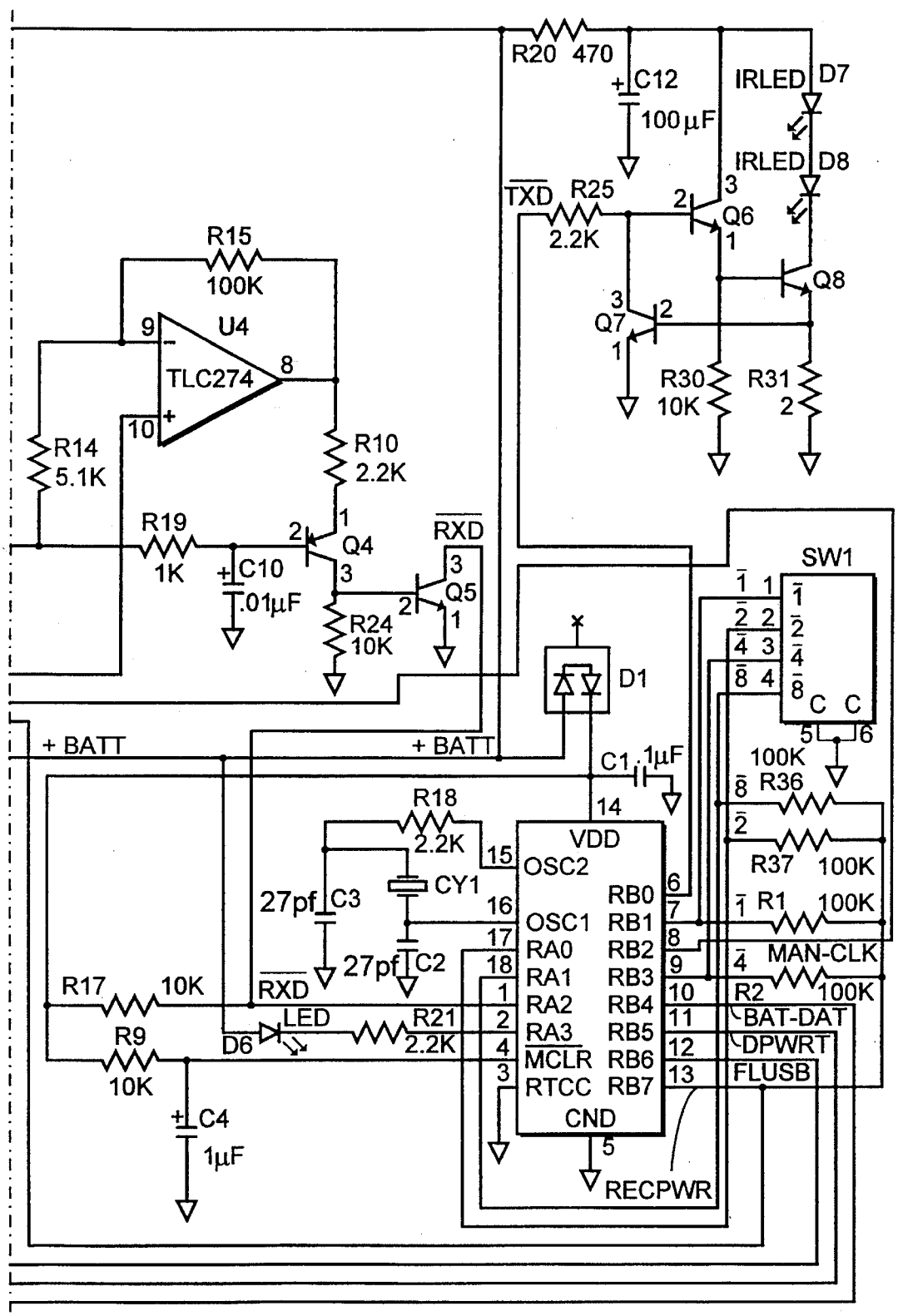

The Impulse sensor circuit, further detailed in the block diagram FIG. 10, and schematic diagram FIG. 11, uses infrared light emitting diodes (IRLED's) to send out pulses of light energy. The amount of energy is controlled by a current regulating circuit so that the output power of the IRLEDs remains constant throughout the life of battery, This infrared light is reflected off of an individual or object back to the Impulse sensor where it strikes a photo diode that is especially sensitive to light in the infrared area of the spectrum. The current that develops across this photo diode is amplified by several stages of operational amplifiers (OP-AMPS). The train of pulses created through this amplification is recognized by the micro controller as the presence of an individual or object. The distance at which an object can be detected is controlled in the final stage of the amplifiers. A digital potentiometer in the circuit outputs a voltage that is used to determine the amplitude of the reflected signal. This setting, or "range", can be set by the installer of the device by adjusting a single turn potentiometer located inside the Impulse unit. Usable range of the unit can be from twelve to fifty-two inches. The mount of time that the Impulse unit will operate the solenoid is determined by setting a binary coded decimal switch that is connected to the inputs of the micro controller. Flush times can be varied From eight hundred milliseconds to two and one half stands. The six volt lithium batter provides reliable operation through tens of thousands of flushes. Normal operation includes a sentinel flush every twenty four hours for sanitary purposes. A visible light on the front of the Impulse unit will illuminate once the micro controller has detected that the battery level has dropped to a point that The battery should be replaced.

Figure 12A:
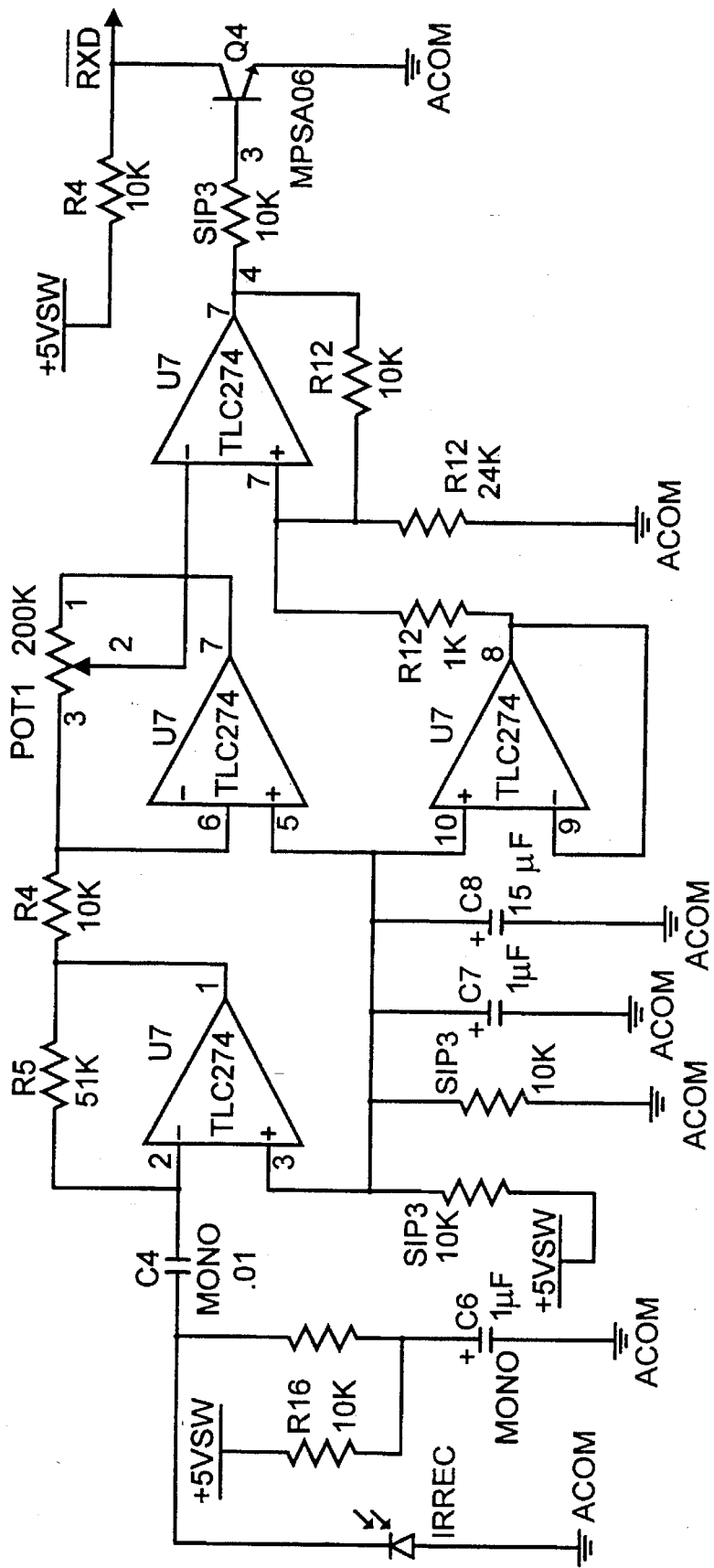
FIG. 12 which is composed of three sheets designated FIG. 12A, FIG. 12B
FIG. 12C is a circuit diagram of the embodiment shown in FIG. 2 specifically illustrating the transmitter and receiver.
Figure 12B:
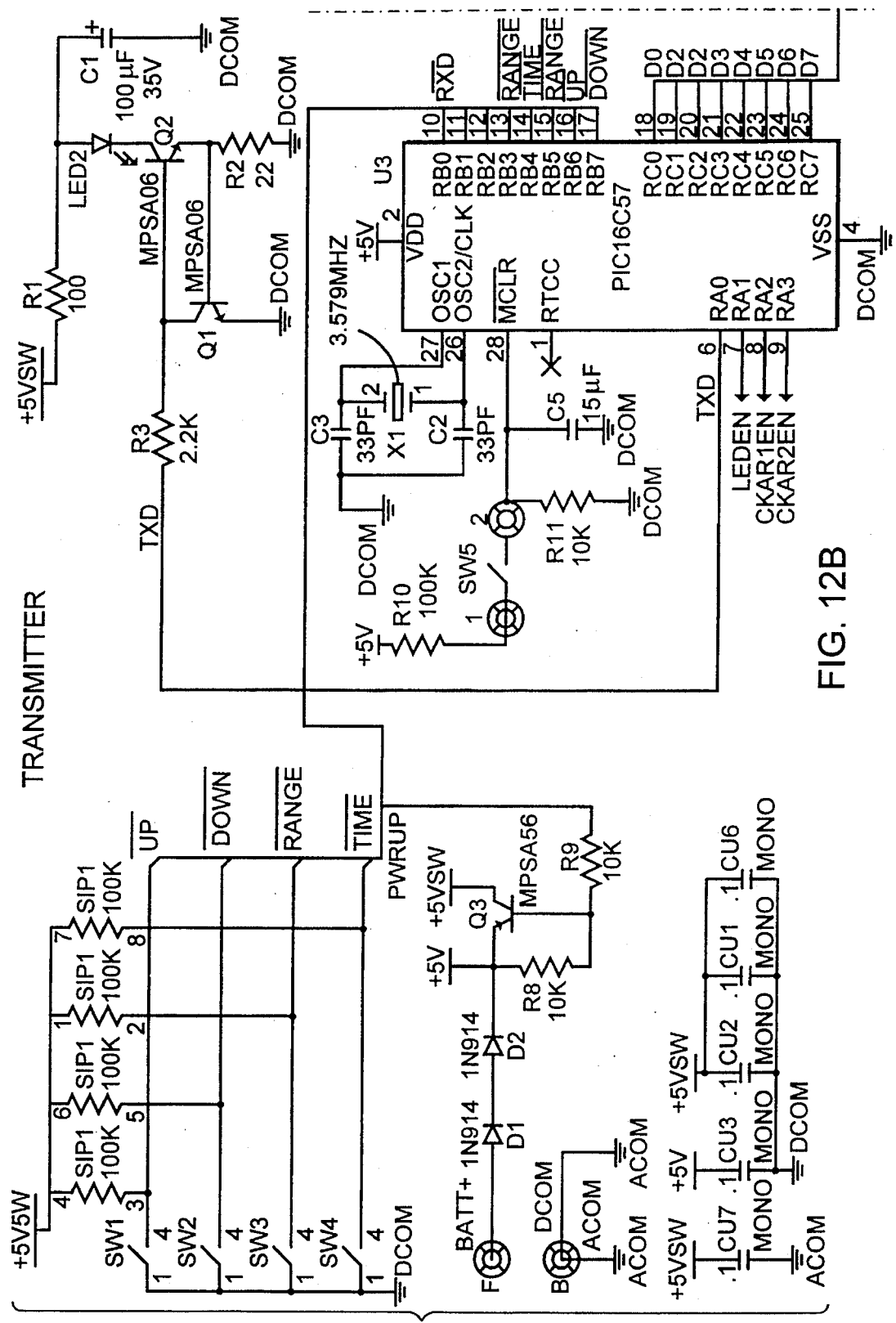
Figure 12C:
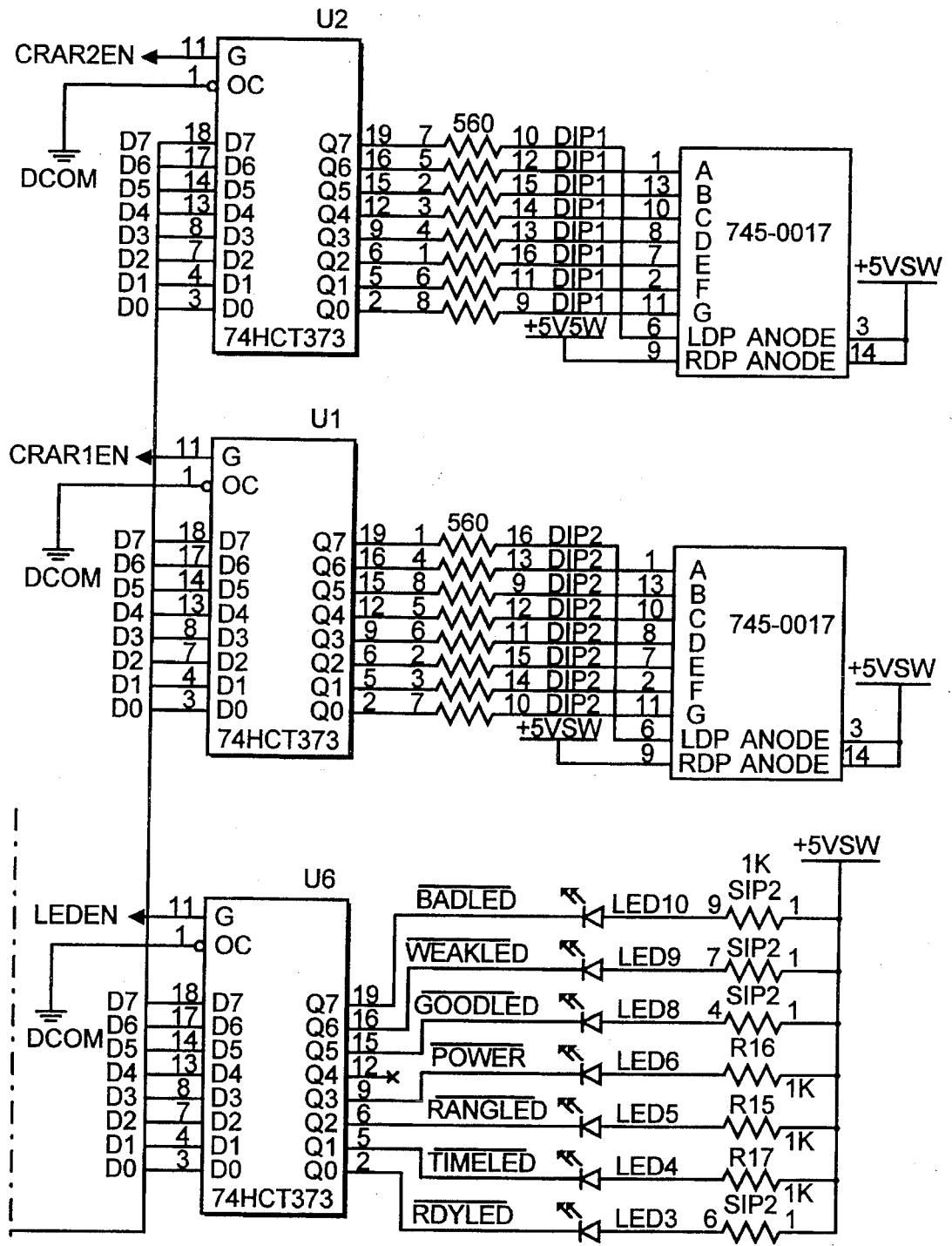

FIG. 12 is the schematic diagram of the circuit for the remote control unit which can be used in conjunction with the Impulse sensor for range and dwell adjustments.

We claim:

1. Pulsed infrared sensor including a solenoid to detect the presence of a person or object whereupon the solenoid is activated to regulate fluid flow, comprising:

a control circuit having a power supply for supplying required power to said solenoid for operation thereof;

means including at least one LED (light-emitting diode) for transmitting pulses of infrared light energy with a digital code towards the person or object;

means operatively associated with said transmitting means and responsive only to said digital code for receiving the light energy reflected from the person or object;

a microcontroller responsive to operational amplifier means delivering a train of pulses for recognizing said train of pulses;

means for controlling the distance at which the person or object can be detected;

means for determining the amplitude of the signal reflected and received by said receiving means, including means for adjustment of the amplitude; and adjustment means coupled with said solenoid and operatively coupled with said microcontroller including means for setting a binary coded decimal switch means for controlling the duration that the sensor will operate the solenoid.

2. The sensor as claimed in claim 1, wherein said transmitting means includes a current regulating circuit for maintaining the output of said at least one infrared light emitting diode constant throughout the life of the power supply.

3. The sensor unit as claimed in claim 1, wherein said receiving means includes a photo-diode sensitive to light in the infrared area of the spectrum with a digital code.

4. The sensor as claimed in claim 1, wherein said digital code is a security code to render said receiving means responsive to said transmitting means when transmitting the pulses of infrared light energy with said digital security code.

5. The sensor unit as claimed in claim 1, wherein said transmitting means includes dual transmitters for transmitting processor controlled encoded signals, and said receiving means includes a receiver having the capability of recognizing error free signals.

6. The sensor unit as claimed in claim 1, wherein said distance controlling means for controlling the distance at which a person or an individual can be detected includes voltage comparing means, and an amplifier responsive to the reflected signal received by the photo-diode, said voltage comparing means being responsive to said amplifier output for comparing the amplifier output to a voltage that represents a selected range setting.

7. The sensor unit as claimed in claim 1, wherein said amplitude determining means includes a digital potentiometer for outputting a voltage determining the amplitude of the reflected signal.

8. The sensor unit as claimed in claim 1, wherein said transmitting means is a remote transmitter, and said amplitude determining means includes a digital potentiometer for outputting a voltage determining the amplitude of the reflector signal.

9. The sensor unit as claimed in claim 1, wherein said amplitude determining means includes a digital potentiometer having a single turn potentiometer whereby to permit adjustment thereof when positioned inside of said sensor.

10. The sensor unit as claimed in claim 9, including adjustment means associated with said digital potentiometer for adjustment thereof externally.

11. The sensor unit as claimed in claim 10 wherein said adjustment means includes a remote control separate from said digital potentiometer for external adjustment thereof.

12. The sensor as claimed in claim 1, wherein said amplitude determining means includes a manual potentiometer and a digital potentiometer, and wherein said manual potentiometer can override the digital potentiometer and the digital potentiometer can override the manual potentiometer.

13. The sensor unit as claimed in claim 1, wherein said power supply is a lithium battery.

14. The sensor unit as claimed in claim 1, including timer means for activating a flush valve at least once every twenty-four hours, and a remote control separate from the solenoid for overriding said timer means.

15. The sensor unit as claimed in claim 1, including visible light means associated with an impulse unit for illumination when said microcontroller detects that the battery level has dropped below a point when battery replacement is considered desirable.

16. The sensor unit as claimed in claim 1, wherein said adjustment means is a potentiometer adjustment means.

17. The sensor unit as claimed in claim 1, wherein said transmitting means transmits pulses of light energy at a 16° angle from the horizontal.

18. The sensor unit as claimed in claim 1, wherein said receiving means is responsive to said detecting means and said detecting means detects signals reflected from an individual or object at a 16° angle from the horizontal plane.

19. The sensor unit as claimed in claim 1, wherein said light emitting means is at least one infrared light emitting diode.

20. The sensor unit as claimed in claim 1, wherein said binary coded decimal switch means is adjustable to operate said solenoid to provide a variable flush time which varies between eight hundred milliseconds and two and one-half seconds.

21. The sensor unit as claimed in claim 1, wherein said distance controlling means for controlling the distance at which an object or a person can be detected includes a digital potentiometer and an amplifier for receiving the reflected signal and producing an amplifier output, and a fraction of the output selected by said digital potentiometer is compared to a fixed reference voltage.

22. The sensor unit as claimed in claim 1, including a remote control for transmitting an infrared signal with a binary code to operate circuitry for said solenoid so that solenoid is rendered operable.

23. The sensor unit as claimed in claim 22, wherein said binary code digital signal includes a digital signal includes a digital security code to which solely said solenoid circuitry is responsive.

* * * * *